US007795846B2

(12) United States Patent
Martin

(10) Patent No.: US 7,795,846 B2
(45) Date of Patent: Sep. 14, 2010

(54) DETERMINING AVERAGE OUTPUT CURRENT IN DC-DC CONVERTER

(75) Inventor: Steven Leo Martin, Chelmsford, MA (US)

(73) Assignee: Linear Technology Corporation, Milpitas, CA (US)

( * ) Notice: Subject to any disclaimer, the term of this patent is extended or adjusted under 35 U.S.C. 154(b) by 309 days.

(21) Appl. No.: 11/783,957

(22) Filed: Apr. 13, 2007

(65) Prior Publication Data
US 2008/0252275 A1   Oct. 16, 2008

(51) Int. Cl.
*G05F 1/00* (2006.01)
(52) U.S. Cl. ........................... 323/222; 323/284
(58) Field of Classification Search .......... 323/222, 323/224, 225, 271, 282–288; 363/16, 20, 363/21.01, 84, 97; 327/540, 134, 327
See application file for complete search history.

(56) References Cited
U.S. PATENT DOCUMENTS
5,920,471 A * 7/1999 Rajagopalan et al. ......... 363/89

7,425,819 B2 * 9/2008 Isobe ......................... 323/222

* cited by examiner

Primary Examiner—Rajnikant B Patel
(74) Attorney, Agent, or Firm—McDermott Will & Emery LLP

(57) ABSTRACT

A switching circuit for converting an input voltage into an output voltage has an input terminal for receiving the input voltage. A power switching element is coupled to the input terminal and has duty cycle d controllable to adjust the output voltage with respect to a desired level using inductor current representing current in an inductor element connectable to the power switching element. An average and hold circuit is responsive to a voltage at an output of the power switching element to produce an average switch voltage over an ON phase of a switching cycle of the power switching element. A voltage-to-current converter is responsive to the average switch voltage for producing representation of an average inductor current over one or more switching cycles. A current modulator having a duty cycle equal to 1-d modulates the representation of the average inductor current to produce a signal proportional to an average output current of the switching circuit over one or more switching cycles.

24 Claims, 1 Drawing Sheet

DETERMINING AVERAGE OUTPUT CURRENT IN DC-DC CONVERTER

TECHNICAL FIELD

The subject matter of this disclosure relates to power supply circuits, and more particularly to circuitry and methodology for determining average output current in an inductive DC-DC converter.

BACKGROUND

In some application, it may be desirable to accurately determine average output current of an inductor-based DC-DC converter in order to use this information to either limit the output current to a safe level or to disable the converter to preserve battery life when a certain output current level is reached.

For example, in USB-ON-THE-GO applications, a portable converter may supply a regulated 5V boosted voltage to an external connector using a lower voltage Li-Ion battery. Since the output of the converter is exposed, via the connector, to an influence of an external device, the converter may experience fault conditions, such as a short circuit to ground. Therefore, it may be necessary to limit the output current of such a converter or to disable it for preserving battery life.

Furthermore, it would be desirable to measure the average output current fairly accurately so that a converter can always deliver a minimum required current but not a current produced at a level significantly higher than necessary due to a less accurate current measuring technique. For example, a converter may be required to deliver a 500 mA minimum amount of current required by the USB-ON-THE-GO specification.

Moreover, in accordance with a conventional technique, output current may be directly sensed using a current sensing resistor. However, a conventional current sensing resistor has a very large size. Therefore, it occupies substantial space on a circuit board increasing the cost of a converter and causing significant power loss. Accordingly, it would be desirable to determine the output current without the use of a current sensing resistor.

SUMMARY OF THE DISCLOSURE

In accordance with one aspect of the present disclosure, a switching circuit for converting an input voltage into an output voltage comprises an input terminal for receiving the input voltage. A power switching element is coupled to the input terminal and has duty cycle d controllable to adjust the output voltage with respect to a desired level using inductor current representing current in an inductor element connectable to the power switching element. An average and hold circuit is responsive to a voltage at an output of the power switching element to produce an average switch voltage during the ON phase of the switching cycle of the power switching element. A voltage-to-current converter is responsive to the average switch voltage for producing representation of an average inductor current over one or more switching cycles of the power switching element. A current modulator having a duty cycle equal to 1-d modulates the representation of the average inductor current to produce a signal proportional to an average output current of the switching circuit over one or more switching cycles of the power switching element.

For example, the switching circuit may be a boost converter that produces the output voltage exceeding the input voltage.

In accordance with another aspect of the present disclosure, resistance of the power switching element, instead of a current sensing resistor, may be used to determine the inductor current.

In accordance with a further aspect of the disclosure, the average and hold circuit may comprise a first switching element operating in phase with the power switching element. A resistor-capacitor (RC) circuit may be coupled to the output of the first switching element.

In accordance with an embodiment of the disclosure, the voltage-to-current converter may comprise a sense switching element coupled to the input terminal and having resistance proportional to the resistance of the power switching element. An operational amplifier may have a first input responsive to the average switch voltage and a second input coupled to the sense switching element. A driver may be coupled to the output of the operational amplifier for supplying an output signal of the operational amplifier to the sense switching element.

The current modulator may comprise a second switching element having an input responsive to the representation of the average inductor current and an output for producing the signal proportional to the average output current. The input of the second switching element may be connected to the output when the power switching element is in off-state, or may be grounded when the power switching element is in on-state.

A current mirror circuit may be coupled between the voltage-to-current converter and the current modulator.

In accordance with a method of the present disclosure, the following steps are carried out to determine average output current in a switching circuit for converting an input voltage into an output voltage and having a power switching element connectable to an inductor element:

producing an average value of a voltage at an output of the power switching element over the ON phase of the switching cycle of the power switching element, converting the average value of the voltage into representation of an average inductor current, the inductor current may be determined using resistance of the power switching element, and modulating the representation of average inductor current with a duty cycle equal to 1-d, where d is a duty cycle of the power switching element, to produce a signal representing the average output current.

In accordance with a further aspect of the disclosure, a converter for producing a DC output voltage in response to a DC input voltage comprises a power switching element having a duty cycle d controllable to produce the output voltage at a desired level using an inductor current representing current in an inductor element connectable to the power switching element, and a current determining circuit for determining an average output current of the converter. The current determining circuit may include a current generator for producing an average current signal representing an average value of the inductor current over the ON phase of the switching cycle of the power switching element, and an output switching element responsive to the average current signal to produce a signal representing the average output current. The output switching circuit may have a duty cycle equal to 1-d.

The current generator may include an average and hold circuit responsive to a voltage at the output of the power switching element for producing an average switch voltage over the ON phase of the switching cycle of the power switching element.

Also, the current generator may include a voltage-to-current converter responsive to the average switch voltage for producing the average current signal. As the resistance of the power switching element is used to determine the inductor current, the voltage-to-current converter may include a sense switching element having resistance representing the resistance of the power switching element.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of current determining circuitry in a boost converter. It will become apparent, however, that the concept of the disclosure is applicable to determining an average output current in any DC-DC converter.

Figure 1:
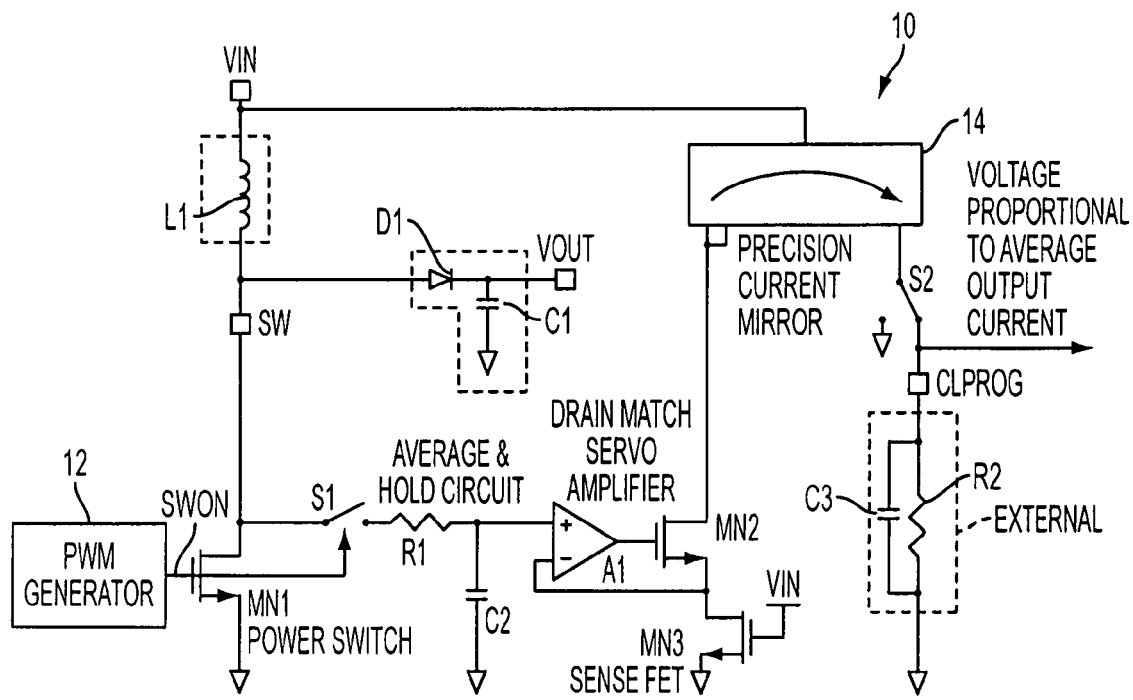
FIG. 1 schematically illustrates an exemplary DC-DC boost converter of the present disclosure.

As shown in FIG. 1, an exemplary boost converter 10 of the present disclosure comprises input node VIN for receiving an input voltage and output node VOUT for producing a regulated output voltage boosted with respect to the input voltage. A power switch may be a field-effect transistor (FET) switch implemented using an NMOS transistor MN1 having a gate controlled by a pulse-width modulation (PWM) generator 12 that produces a PWM signal SWON for controlling duty cycle d of the power switch MN1 to adjust the output voltage with respect to a desired level.

An inductor L1, diode D1 and capacitor C1 are connected between the input node VIN and the output node VOUT to deliver power to the output node. These elements may be external with respect to the boost converter chip. Alternatively, they may be provided on the chip. A PMOS transistor switchable out of phase with respect to the power switch MN1 may be used instead of the diode D1. The PMOS transistor may be arranged on the boost converter chip or may be provided externally with respect to the chip.

Figure 2:
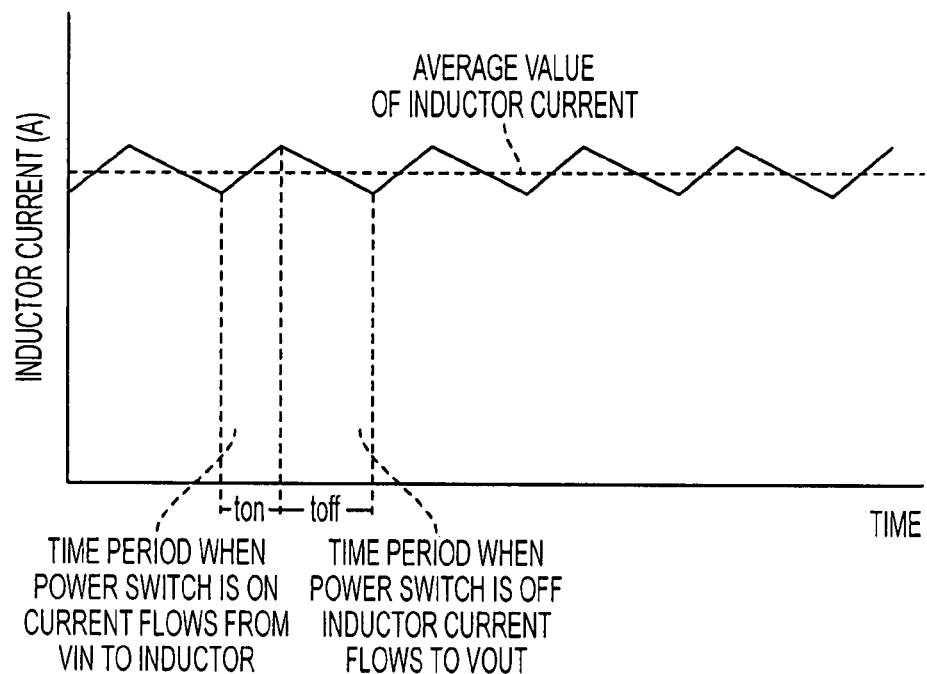
FIG. 2 shows an exemplary waveform of an inductor current in the converter of the present disclosure.

During time period ton (FIG. 2), when the power switch MN1 is in the on state, i.e. closed, the input voltage VIN is impressed across the inductor L1, and the diode D1 prevents the capacitor C1 from discharging VOUT to the ground. As the input voltage is a DC voltage, current through the inductor L1 rises linearly with time at a rate proportional to the input voltage divided by the inductance of the inductor L1. During time period toff (FIG. 2), when the power switch MN1 is in the off state, i.e. open, the inductor current flows through the diode D1 to charge the output node VOUT. During time period toff (FIG. 2), when the power switch MN1 is in the off state, i.e. open, the inductor current flows through the diode D1 to charge the output node VOUT. During time period toff (FIG. 2) the slope of the inductor current reverses and the inductor current falls. In steady state operation, the inductor current is equal at the beginning, end and at each corresponding point of each switching cycle.

Hence, in a steady-state operating condition, the current flowing through the inductor L1 over the entire switching cycle of the power switch has a triangular waveform. Therefore, the average value of the inductor current during its rising period is equal to the average value of the inductor current during its falling period. The boost converter 10 may operate in a continuous conduction mode and its inductor current is always positive, i.e. current is always flowing into the load.

As discussed in more detail below, the topology of the boost converter 10 exploits that the average value of the inductor current during its rising period is equal to the average value of the inductor current during its falling period. The boost converter 10 may use the on-resistance of the power switch MN1 to detect the inductor current, and a unique phasing technique to send a representation of the output current to a precision sense resistor.

In particular, the boost converter 10 may include an average and hold circuit coupled to the drain of the FET power switch MN1 and composed of switch S1, resistor R1 and capacitor C2. The switch S1 controlled by the SWON signal produced by the PWM generator 12 operates in phase with the power switch MN1. The average and hold circuit senses the voltage on the drain of MN1 during the time when the power switch MN1 is on. Since the switch S1 is on only when MN1 is on, the switch voltage produced at the output of MN1 is rejected when its value is high, i.e. when power is being delivered to the output node VOUT. Therefore, the voltage on the hold capacitor C2 represents the average inductor current during the power switch on-time multiplied by the resistance of the power switch MN1 when MN1 is on. Hence, an average switch voltage over the ON phase of the switching cycle of the power switch MN1 is developed at the output of the average and hold circuit.

Further, the boost converter 10 includes a voltage-to-current converter responsive to the average switch voltage at the output of the average and hold circuit for producing representation of an average inductor current over one or more switching cycles of the power switch MN1. The voltage-to-current converter may include a drain match servo amplifier and a current sensing element. The drain match servo amplifier may be composed of operational amplifier A1 and NMOS transistor MN2. The current sense element may be implemented using NMOS transistor MN3. The gate of NMOS transistor MN3 would preferably be coupled to a voltage equal to the gate voltage of power switch MN1 when MN1 is ON. A non-inverting input of the operational amplifier A1 may be coupled to the output of the average and hold circuit, whereas an inverting input of A1 may be connected to the drain of MN3 coupled to the source of MN2. The output of A1 may be connected to the gate of MN2.

The transistor MN3 may be configured to have resistance accurately representing the resistance of the transistor MN1. Such an arrangement makes it possible to determine the inductor current using the resistance of the power switch MN1, without an additional current sensing resistor. In particular, the transistor MN3 may be a scaled version of MN1 configured so as to make a current flowing through MN3 equal to a precise fraction of the current that flows through MN1 when MN1 is on. For example, MN3 may be designed to have 5,000 times the resistance of MN1. The transistors MN1 and MN3 may be fabricated on the same chip and may have the same gate potential. Therefore, the ratio between their currents may be accurately controlled.

The drain match servo amplifier impresses the voltage at the output of the average and hold circuit on the drain of MN3. The current flowing in MN3 and MN2 is a scaled replica of the current in the inductor L1 averaged over the period when the power switch MN1 is on. As discussed above, the inductor current has a triangular waveform. Therefore, the current in the drain of the transistor MN2 is directly proportional to the average inductor current over one or more switching cycles of the power switch MN1.

The drain of MN2 may be coupled to a precision current mirror 14 that reflects the current of MN2 down towards ground. The current mirror 14 may provide additional scaling, up or down, of the inductor current produced by the voltage-to-current converter.

Due to the average and hold circuit's filtering of the signal at the output of the switch, amplifier A1 may maintain a closed loop during the entire switching cycle and thus may respond only to frequency components below the cutoff frequency of an RC circuit composed of the resistor R1 and capacitor C2. Therefore, the current from the drain of MN2 is a nearly DC signal having very low content of switching frequency components. Hence, the current mirror 14 also produces a nearly DC signal at its output.

The output of the current mirror 14 is coupled to a current modulator having a duty cycle equal to 1-d, where $$d = \frac{ton}{ton + toff}$$

is the duty cycle of the power switch MN1. The current modulator may be implemented using single pole double throw switch S2 controlled by a signal inverted with respect to the signal SWON produced by the PWM generator 12. This switch steers the current from the output of the current mirror 14 to either a current limit programming pin CLPROG or ground. In particular, when the power switch MN1 is off, the switch S2 is controlled to connect the output of the current mirror 14 to the CLPROG pin. When the power switch MN1 is on, the switch S2 is controlled to connect the output of the current mirror 14 to ground. Hence, the switch S2 operates 180 degrees out of phase with respect to the power switch MN1 and has a duty cycle equal to 1-d.

As the average value of the inductor current during its rise time is precisely equal to its average value during its fall time, the average current delivered to the CLPROG pin is a precise fraction of the average current delivered to the output node VOUT. Hence, the phasing provided by the switch S2 allows a representation of the average inductor current to be converted into a representation of the output load current.

The CLPROG pin enables a user to accurately determine the average output current of the boost converter 10 and to perform desired operations based on this value. For example, the average output current value determined at the CLPROG pin may be used to provide programmable output current limiting or to linearly and continuously regulate output power.

Resistor R2 may be connected to the CLPROG pin to produce a desired voltage value proportional to the average output current delivered to the CLPROG pin. The current supplied from the switch S2 is pulsatile. Averaging capacitor C3 may be connected to the CLPROG pin to filter the current and make the CLPROG voltage essentially a DC signal. The resistor R2 and capacitor C3 may be external components selected by a user to define both the sensitivity and the accuracy of the circuit for determining the average output current of the present disclosure. In some switching USB power path devices, an external resistor-capacitor combination is used to set the input current limit. These components may be also used as the resistor R2 and capacitor C3 to control the average output current.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A switching circuit for converting an input voltage into an output voltage, comprising:
   an input terminal for receiving the input voltage,
   a power switching element coupled to the input terminal and having duty cycle d controllable to adjust the output voltage with respect to a desired level using inductor current representing current in an inductor element connectable to the power switching element,
   an average and hold circuit responsive to a voltage at an output of the power switching element to produce an average switch voltage over an ON phase of a switching cycle of the power switching element;
   a voltage-to-current converter responsive to the average switch voltage for producing representation of an average inductor current over one or more switching cycles of the power switching element; and
   a current modulator having a duty cycle equal to 1-d for modulating the representation of the average inductor current to produce a signal proportional to an average output current of the switching circuit over one or more switching cycles of the power switching element.

2. The switching circuit of claim 1, wherein the output voltage exceeds the input voltage.

3. The switching circuit of claim 1, wherein resistance of the power switching element is used to determine the inductor current.

4. The switching circuit of claim 1, wherein the average and hold circuit comprises a first switching element operating in phase with the power switching element.

5. The switching circuit of claim 4, wherein the average and hold circuit further comprises a resistor-capacitor (RC) circuit coupled to the output of the first switching element.

6. The switching circuit of claim 1, wherein the voltage-to-current converter comprises a sense switching element having resistance proportional to the resistance of the power switching element.

7. The switching circuit of claim 6, wherein the voltage-to-current converter further comprises an operational amplifier having a first input responsive to the average switch voltage and a second input coupled to the sense switching element.

8. The switching circuit of claim 7, wherein the voltage-to-current converter further comprises a driver coupled to the output of the operational amplifier for supplying an output signal of the operational amplifier to the sense switching element and conveying current in the sense switching element.

9. The switching circuit of claim 1, wherein the current modulator comprises a second switching element having an input responsive to the representation of the average inductor current and an output for producing the signal proportional to the average output current.

10. The switching circuit of claim 9, wherein the input of the second switching element is connected to the output when the power switching element is in off-state.

11. The switching circuit of claim 10, wherein the input of the second switching element is grounded when the power switching element is in on-state.

12. The switching circuit of claim 1, further comprising a current mirror circuit coupled between the voltage-to-current converter and the current modulator.

13. A method for determining average output current in a switching circuit for converting an input voltage into an output voltage and having a power switching element connectable to an inductor element, the method comprising the steps of:
producing an average value of a voltage at an output of the power switching element over an ON phase of a switching cycle of the power switching element,
converting the average value of the voltage into representation of an average inductor current, and
modulating the average inductor current with a duty cycle equal to 1-d, where d is a duty cycle of the power switching element, to produce a signal representing the average output current.

14. The method of claim 13, wherein the inductor current is determined using resistance of the power switching element.

15. The method of claim 13, wherein the output voltage is a regulated voltage exceeding the input voltage.

16. The method of claim 15, wherein the duty cycle of the power switching element is controlled to regulate the output voltage.

17. A converter for producing a DC output voltage in response to a DC input voltage, comprising:

a power switching element having a duty cycle d controllable to produce the output voltage at a desired level using an inductor current representing current in an inductor element connectable to the power switching element, and
a current determining circuit for determining an average output current of the converter, the current determining circuit including:
a current generator for producing an average current signal representing an average value of the inductor current over an ON phase of a switching cycle of the power switching element, the current generator including an average and hold circuit responsive to a voltage at the output of the power switching element for producing an average switch voltage over an ON phase of a switching cycle of the power switching element; and
an output switching element responsive to the average current signal to produce a signal representing the average output current.

18. The converter of claim 17, wherein the output switching circuit has a duty cycle equal to 1-d.

19. The converter of claim 17, wherein resistance of the power switching element is used to determine the inductor current.

20. The converter of claim 17, wherein the average and hold circuit includes an averaging switching element responsive to the output of the power switching element and operating in phase with the power switching element.

21. The converter of claim 20, wherein the average and hold circuit further comprises an RC circuit coupled to an output of the averaging switching element.

22. The converter of claim 21, wherein the current generator further comprises
a voltage-to-current converter responsive to the average switch voltage for producing the average current signal.

23. The converter of claim 22, wherein the voltage-to-current converter includes a sense switching element having resistance representing the resistance of the power switching element.

24. The converter of claim 17, wherein the average value is held during an OFF phase of the switching cycle of the power switching element.

* * * * *